United States Patent [19]
Kuck et al.

[11] 3,821,736
[45] June 28, 1974

[54] FREQUENCY DIVERSITY PULSE DOPPLER RADAR

[75] Inventors: John H. Kuck; Donal B. Staake, both of Silver Spring, Md.

[73] Assignee: The United States of America as represented by the Secretary of the Navy, Washington, D.C.

[22] Filed: Oct. 5, 1962

[21] Appl. No.: 229,289

[52] U.S. Cl.................... 343/7.7, 343/14, 343/17.5
[51] Int. Cl............................................. G01s 9/26
[58] Field of Search...................... 343/7.7, 14, 17.5

[56] References Cited
UNITED STATES PATENTS
3,066,289  11/1962  Elbinger............................. 343/7.7

Primary Examiner—Malcolm F. Hubler

EXEMPLARY CLAIM

4. A frequency diversity pulse Doppler radar system comprising a directive antenna, transmitting means for providing a plurality of signals of different fixed frequencies connected to said antenna so as to generate exploratory pulses of electromagnetic energy, a stable local oscillator, modulating means connected to said transmitting means and said local oscillator for providing a timing reference signal, a first mixer connected to said modulator and said antenna for combining said timing reference signal and a target echo signal to produce a carrier Doppler signal, a second mixer connected to said first mixer and said local oscillator for detecting the Doppler portion of said target echo signal, a plurality of mechanical phase shifters having their outputs connected to said second mixer, a first switch means connected to each of said mechanical phase shifters and to said local oscillator for selectively connecting said oscillator to one of said mechanical phase shifters, and a control means for driving each phase shifter at a continuously varying speed until a proper Doppler signal is detected by said second mixer and for driving each phase shifter at a speed equal to the frequency of the Doppler ambiguity produced by a corresponding transmitted frequency after a proper Doppler signal is detected by said second mixer.

18 Claims, 5 Drawing Figures

John H. Kuck
Donal B. Staake
INVENTORS

BY Claude Funkhouser
ATTORNEY

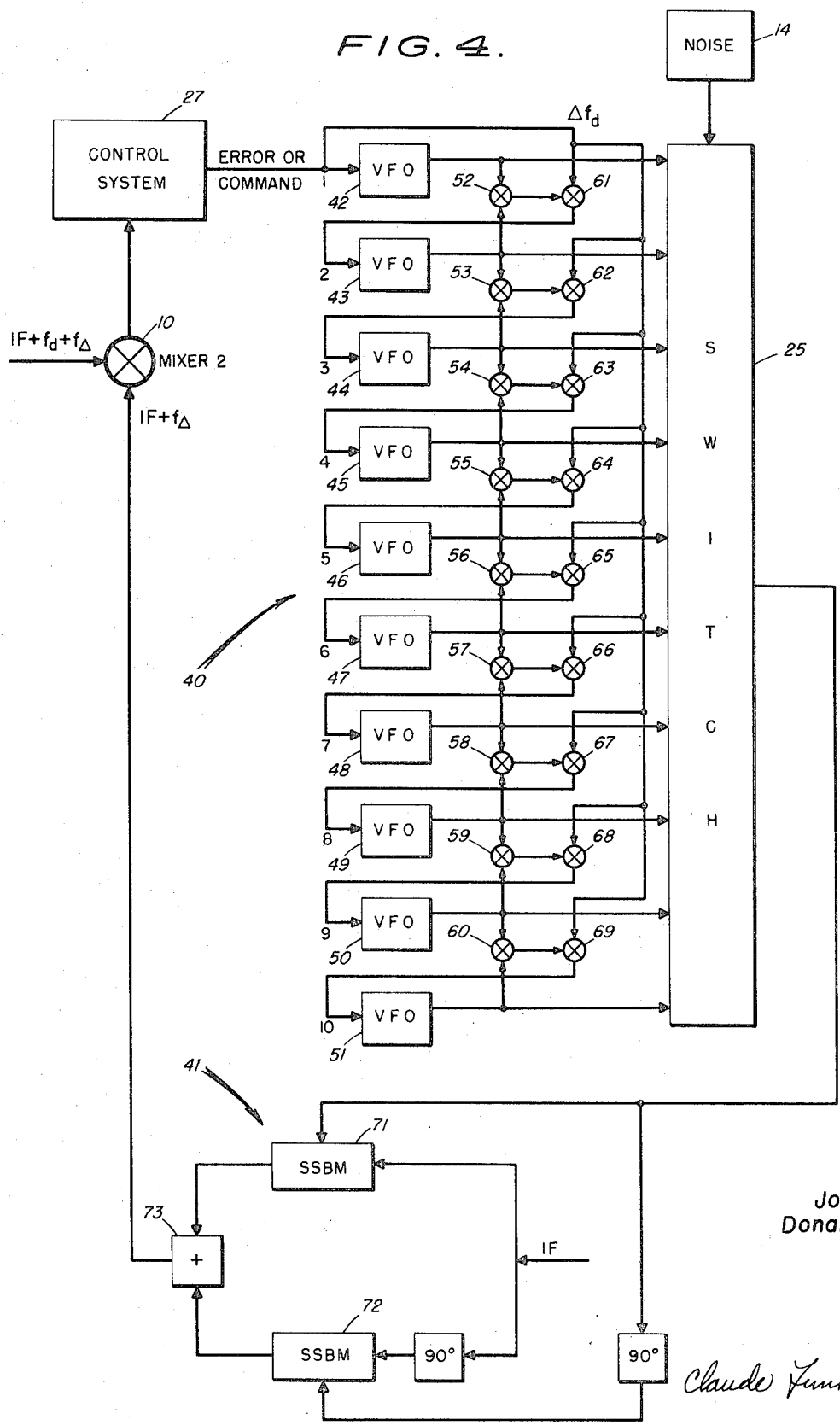

FREQUENCY DIVERSITY PULSE DOPPLER RADAR

The present invention relates in general to coherent pulse Doppler radar systems and more particularly to a multiple frequency search-track radar system.

Coherent radar systems are widely used in both civilian and military applications to detect and track moving targets to the exclusion of fixed objects at a given range. The coherent system is based on the application to the radar receiver of a reference carrier wave voltage which is in phase with the transmitted pulses. The returned signal when compared with the reference wave produces Doppler signals representative of both fixed and moving objects. The signals due solely to moving targets are then separated by various filtering operations.

Future coherent radars for military applications will necessarily be required to change frequency rapidly, possibly pulse to pulse, in order to operate in the countermeasures environment, thereby forcing the enemy to employ wideband barrage jamming. There are also countermeasures advantages to using pulse Doppler type systems since they provide increased discrimination against chaff, and considerable improvement in signal-to-noise ratio in the presence of barrage jamming due to the increased predetection integration. However, there is a certain degree of incompatibility between rapid frequency shift and pulse Doppler since normal pulse Doppler systems require that the transmitter and local oscillator be extremely stable. That the Doppler component of a reflected radar signal from a moving target directly depends upon the radial velocity of the target and the frequency of the transmitted signal is shown by the equation $$f_d = 2 V_t f_o / c$$

in which $V_t$ is the relative velocity of the radar system and the signal returning target, $f_o$ is the frequency of the transmitted signal, and $c$ is the velocity of light. It is evident from the above relationship that a coherent system into which frequency diversity is incorporated will suffer from serious ambiguities since a sudden increase in transmitted frequency $f_o$ will produce an accompanying increase in Doppler frequency $F_d$ and a sudden increase in Doppler frequency will provide a false indication of increased target velocity. It is therefore necessary that a frequency diversity pulse Doppler coherent radar system contain an internal means for correcting or compensating for these Doppler ambiguities.

Some proposals have been made to circumvent the above-described difficulty by the use of a delay line to delay the reference signal by an amount equal to the range delay of the received signal, after which the two signals could be cross-correlated in the receiver. However, if pulse-by-pulse frequency shifts of the order of hundreds of megacycles are to be obtained, such a system would require a very broad bandwidth, would have to be continuously variable and would require a high resolution delay line capable of delays equal to the target range delay. In addition, the bandwidth of the delay line would have to be as great as the bandwidth of the spectrum of the transmitted signal. Such a delay line does not exist at the present time and does not appear to be within the present state of the art.

It is therefore an object of the present invention to provide a multi-frequency coherent radar system in which Doppler ambiguities are corrected through use of phase shifting techniques.

It is still another object of the present invention to provide a frequency diversity pulse Doppler radar system which operates in both the search and track modes and provides for the elimination of Doppler ambiguities through the insertion of compensating signals.

It is a further object of the present invention to provide a frequency diversity pulse Doppler radar system which operates in both the search and track modes and provides for the elimination of Doppler ambiguities through use of signal matching techniques.

Other objects and many of the attendant advantages of this invention will be readily appreciated as the same becomes better understood by reference to the following detailed description when considered in connection with the accompanying drawings, wherein:

FIG. 4 shows an additional phase shift unit which can be used with the invention.

Figure 1:
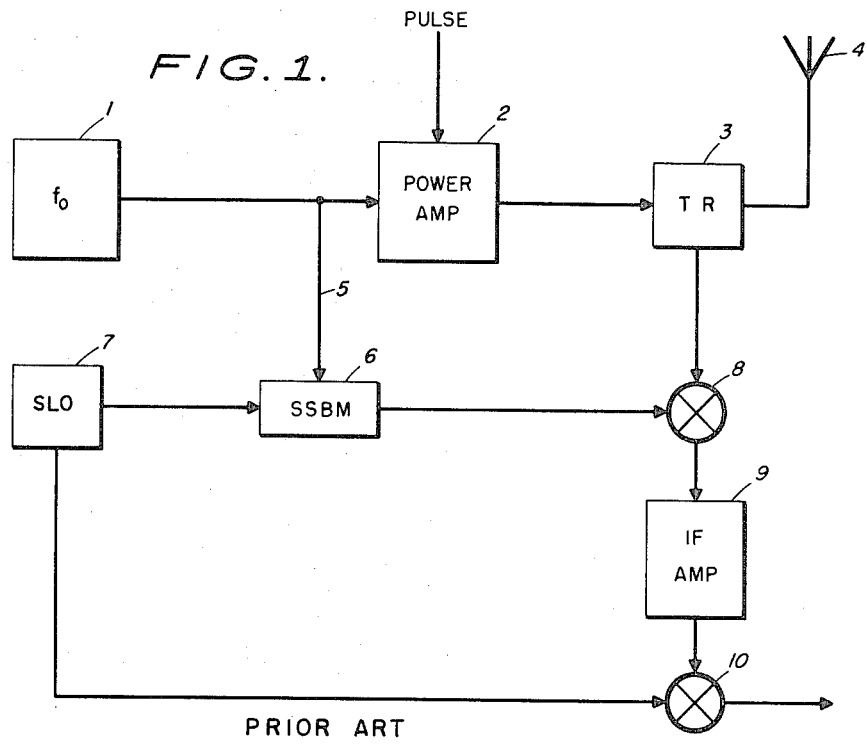
FIG. 1 is a block diagram of a conventional coherent pulse Doppler radar system.

FIG. 1 illustrates a fully coherent pulse Doppler radar system of conventional design. A fixed frequency source 1 is connected via pulsed power amplifier 2 and transmit-receive device 3 to radar antenna array 4 for radiation. At the same time a portion of the transmitted signal is coupled via line 5 to a single-sideband balanced modulator 6 where it is combined with an intermediate frequency signal generated by stable local oscillator 7. When the transmitter is cut off by pulsed amplifier 2, the T-R switch 3 couples antenna 4 to a first mixer 8 where the received signal is mixed with the output of balanced modulator 6 and converted to an intermediate frequency. The output of first mixer 8 is coupled via I.F. amplifier 9 to a second mixer 10 along with the coherent carrier wave reference signal from oscillator 7. The output of second mixer 10, which consists only of Doppler frequencies, is applied to a utilization circuit which comprises the necessary Doppler frequency acquisition and tracking circuits to enable acquisition and tracking of Doppler frequency target signals. The signal is then further processed to extract velocity and range information pertaining to the target being tracked.

Considering for a moment the operation of the system of FIG. 1, with no switching of the transmitted frequency the received signal will be shifted in frequency away from the transmitted frequency by an amount proportional to the target range rate. In the first mixer 8 the received signal is coherently detected using the transmitted frequency plus the I.F. oscillator frequency from local oscillator 7 as a reference. The resulting output of the first mixer 8 is a signal which differs from the I.F. center frequency by the target Doppler frequency. The Doppler is recovered from this signal, after amplification in the I.F. amplifier 9, by coherent detection using the local oscillator 7 as a reference.

However, if the transmitted frequency is randomly switched, the frequency and phase of the Doppler signal will change suddenly. The resulting expression for the Doppler signal can be shown to be $$f_d' = (2\ V_t/c)\ (f_o + f_\Delta)$$

where $f_\Delta$ is the incremental change in the transmitted frequency. The increase in the Doppler frequency due to the $f_\Delta$ component is a Doppler ambiguity and must be eliminated before the true Doppler frequency can be utilized. The problem is even further complicated if the velocity of the target is variable. The resulting expression for the Doppler signal is then $$f_d' = (2/c)\ (V_t + V_{\Delta t})\ (f_o + f_\Delta)$$

where $V_t$ is the incremental change in the target velocity. The ambiguity in the Doppler frequency then becomes $$\epsilon = (2/c)\ f_\Delta\ (V_t + V_{\Delta t})$$

Figure 2:
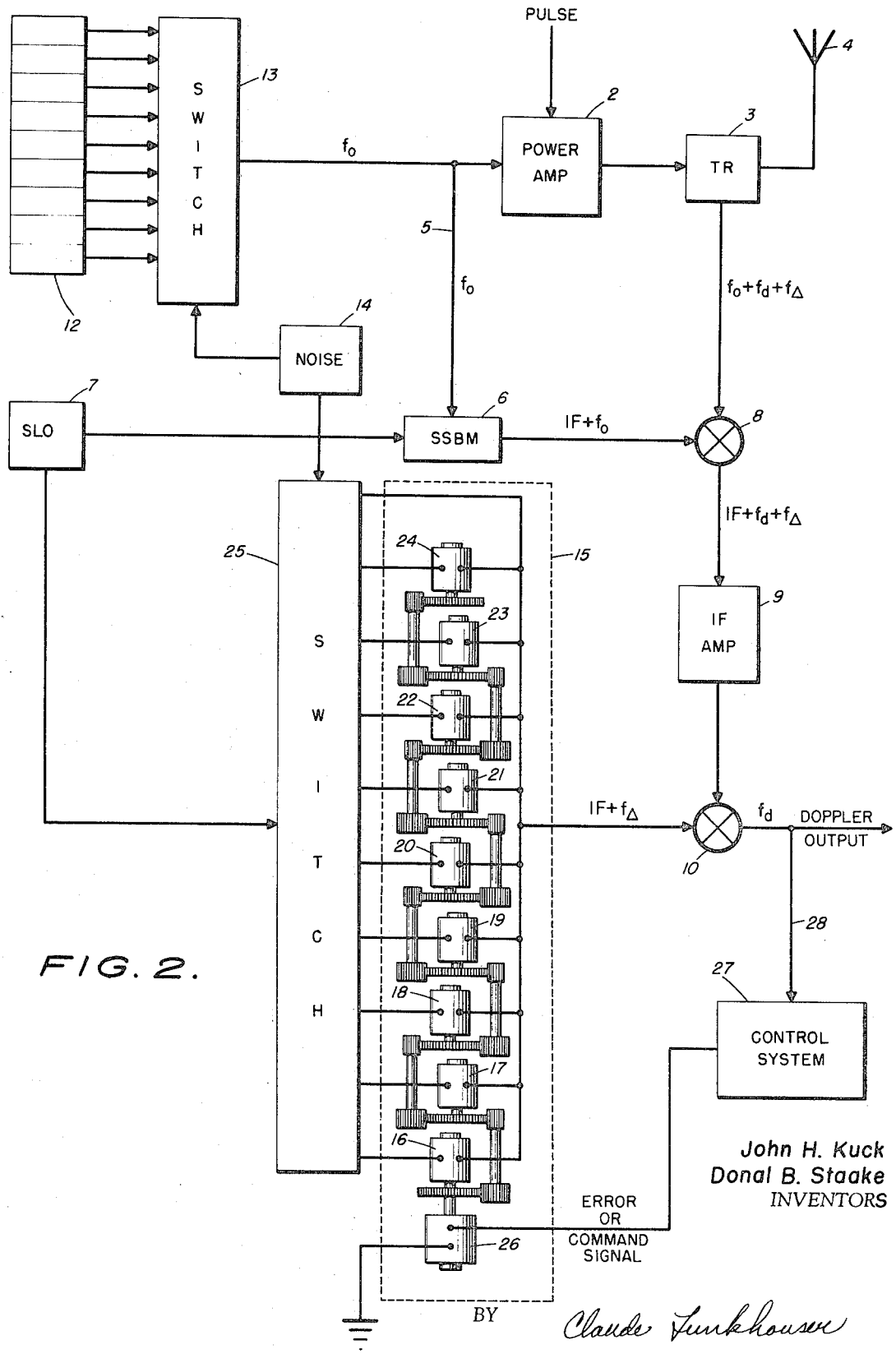
FIG. 2 is a diagram of the system of FIG. 1 into which has been incorporated the principles of the invention.

FIG. 2 shows a pulse Doppler search-track radar system constructed according to the principles of the invention, so as to operate on a multiplicity of frequencies without Doppler ambiguity. Like numerals have been used to designate components which are identical in both FIGS. 1 and 2. A plurality of fixed frequency sources 12 provide the transmitted energy for the system. These sources each produce a different frequency ranging from $f_o$ to $f_o$ ($1 \pm n\Delta$) where $f_o$ is a fixed reference frequency, $\Delta$ is a ratio of two integers representing a constant frequency difference between sources, and $n$ is an integer indicating the number of the source on either side of center frequency $f_o$.

Each of the fixed frequency sources 12 is coupled to a selector switch 13 which randomly selects one source frequency at a time and applies it to pulsed power amplifier 2 for transmission. The switch 13 is controlled by a noise generator 14 so as to provide a truly random frequency selection.

Compensation for the above-described Doppler ambiguities is performed by a continuous phase shifting unit 15 which is inserted in the circuit between stable local oscillator 7 and second mixer 10. The unit 15 consists of a plurality of continuous phase shifters 16 to 24 which correspond to and are equal in number to the fixed frequency sources 12. The coherent reference signal from oscillator 7 is applied to a second selector switch 25 which is identical to switch 13 and serves to apply the reference signal to that phase shifter which corresponds to the source selected by switch 13. The switches 13 and 25 are operated simultaneously by a common signal from the noise generator 14. The outputs from the phase shifters 16 to 24 are connected in parallel since no two phase shifters will have an output at the same time. This common output containing the phase shifted I.F. reference signal is applied to second mixer 10 where it is mixed with the output from I.F. amplifier 9 leaving only Doppler signals.

The Doppler ambiguity due to rapid frequency shift of the radar transmitter is eliminated by inserting the proper phase shift in the reference signal to the second mixer 10. The phase shift that will provide proper elimination of Doppler error will vary according to the transmitted frequency since as indicated this error is directly dependent upon $f_\Delta$ which is equal to $f_o n\Delta$. The Doppler error can thus be expressed as $$\epsilon = (2/c)\ f_o\ (V_t + V_{\Delta t})\ n\Delta,$$

or $$\epsilon = f_d\ n\Delta.$$

The phase shifting unit unit 15, which provides an analogue representation of the particular Doppler error associated with each frequency source 12, is driven by a motor 26 which is controlled by search-track control system 27. The motor 26 is directly geared to the phase shifter 16 such that this phase shifter will rotate at a speed equal to $s\Delta$ where $s$ is the seed of motor 26. The phase shifter 17 is geared down from phase shifter 16 by the factor $s\Delta$ and each of the other phase shifters differs in speed from the preceding phase shifter by this same factor so that the speed of any given phase shifter is $n\Delta s$ where $n$ is the number of the phase shifter.

As previously indicated the Doppler error resulting from the continuous shift of transmitted frequency is $n\Delta f_d$. Thus, in order to provide proper compensation for the Doppler ambiguities of the system the motor speed $s$ should equal $f_d$ thereby providing an output of $n\Delta f_d$ from phase shifting unit 15. When the frequency of the transmitted signal shifts from $f_o$ to $f_o + f_o$ the noise generator 14 will instantaneously switch the coherent reference signal from oscillator 7 through phase shifter 16 so that the input to the second mixer 10 from the phase shifting unit 15 will consist of the I.F. reference frequency plus $\Delta f_d$, the Doppler error. The output of mixer 10 will then consist only of the corrected Doppler frequency.

During the search operation the control system 27 drives the motor 26 through a range of speeds so that the phase shifting unit 15 effectively sweeps through a wide range of Doppler frequencies. Because of the narrow range acquisition attainable, the phase shifting unit 15 acts essentially as a range gate so that mixer 10 will have an output in the Doppler range only when one of the phase shifters in unit 15 provides a proper compensating signal. When, due to the continuous sweeping of the phase shifting unit 15, a proper compensating signal is applied to the mixer 10, this condition is detected by control system 27 through lead 28. Control system 27 immediately switches to the track mode locking motor 26 to a speed proportional to $f_d$.

Figure 3:
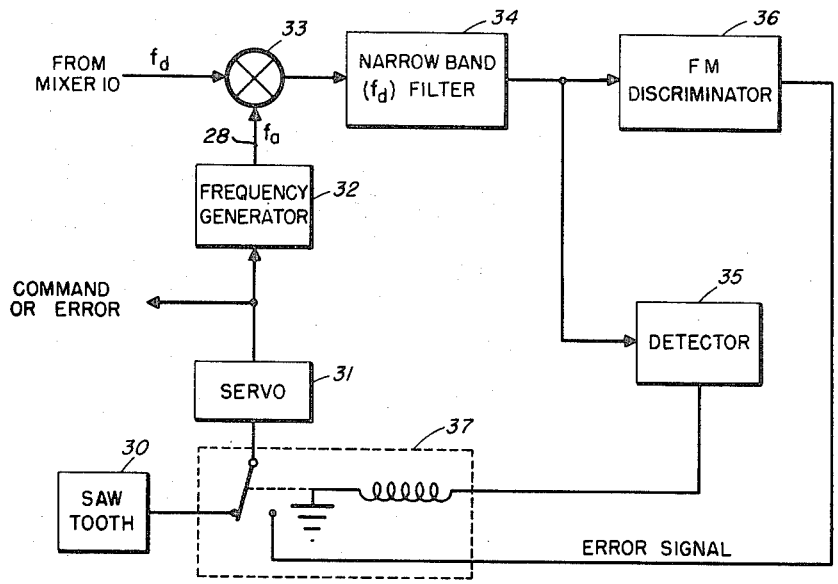
FIG. 3 is a detailed diagram of the control system shown in the system of FIG. 2.

FIG. 3 shows a detail of the control system 27 from FIG. 2. In the search mode a sawtooth generator 30 applies a sweep signal to a servo 31 which provides the necessary variable voltage to motor 26 to effect a sweep of phase shifting unit 15. The output of servo 31 is also applied to a frequency generator 32 whose frequency is varied according to the servo output and is applied to a mixer 33 where it is combined with the output of second mixer 10 applied via line 28. The output of mixer 33, in turn, is applied to a fixed narrow band filter 34. The narrow pass band of filter 34 is selected such that $$f_b = f_d + f_a$$

where $f_b$ is the frequency of filter 34, $f_d$ is the expected Doppler frequency, and $f_a$ is the variable output frequency of generator 32. Thus, when the input to mixer 33 from line 28 and the output of generator 32 add to a frequency that falls within the narrow pass band of filter 34, the filter 34 will produce an output which is applied to a detector 35 and an FM discriminator 36. The detector 35 serves to energize a relay 37 which switches the input to servo 31 from sawtooth generator 30 to FM discriminator 36, thereby closing the loop for error detection and correction. Slight errors which occur in the system are detected by discriminator 36 and applied to servo 31 which corrects both the speed of rotation of phase shifting unit 15 and the output of generator 32.

FIG. 4 illustrates a second type of phase shifter which may be incorporated into the system of FIG. 2. The system consists basically of a phase locked oscillator chain designated generally at 40 and an electronic phase shifter designated generally at 41.

The oscillator chain 40 consists of a plurality of variable frequency oscillators 42 to 51 each linked to one another so that their phases are locked together. The output of each oscillator 42 to 51 is coupled to a comparable mixer 52 to 60, respectively, and is also coupled to the mixer for the preceding oscillator. The mixers 52 to 60 provide the difference between the outputs of consecutive oscillators and apply this difference to a second group of mixers 61 to 69, respectively, where this difference is compared with a common input to each of these second mixers proportional to $\Delta f_d$. The result of this comparison is in turn applied to the second oscillator of each pair being controlled so as to adjust the frequency of this oscillator until its frequency differs from that of the preceding oscillator by $\Delta f_d$. In this way each of the oscillators 42 to 51 is in phase and is locked in frequency $\Delta f_d$ from the preceding oscillator. The result is that each of the oscillators 42 to 51 will produce a signal proportional to $f_d n \Delta$ which is the expected Doppler error for the $n$th transmitted frequency. The first oscillator 42 in the chain must necessarily produce an output of $\Delta f_d$ and must be controlled from outside the chain since it sets the standard for the chain. This controlling signal is derived from the search-track control system 27 discussed in connection with FIG. 2 and shown in detail in FIG. 3. This control system provides both the sweep search signal and the steady Doppler signal to oscillator 42 in a manner already discussed.

The output of each of the oscillators 42 to 51 is applied to the random selector switch 25 which is controlled by noise generator 14. The selected output of switch 25 is then applied to phase shift unit 41. The unit 41 consists of a pair of single sideband balanced modulators 71 and 72 and an adder 73. The I.F. signal from oscillator 7 in FIG. 2 is applied directly to modulator 71 and is applied through a 90° phase shifter to modulator 72. The I.F. signal thus appears as sine and cosine signals in modulators 71 and 72, respectively. The amplitudes of these sine and cosine signals are then modulated by the output of switch 25 such that the addition of the outputs of modulators 71 and 72 in adder 73 produces the required phase shifted I.F. signal necessary to correct the incoming Doppler signal applied to mixer 10.

Figure 5:
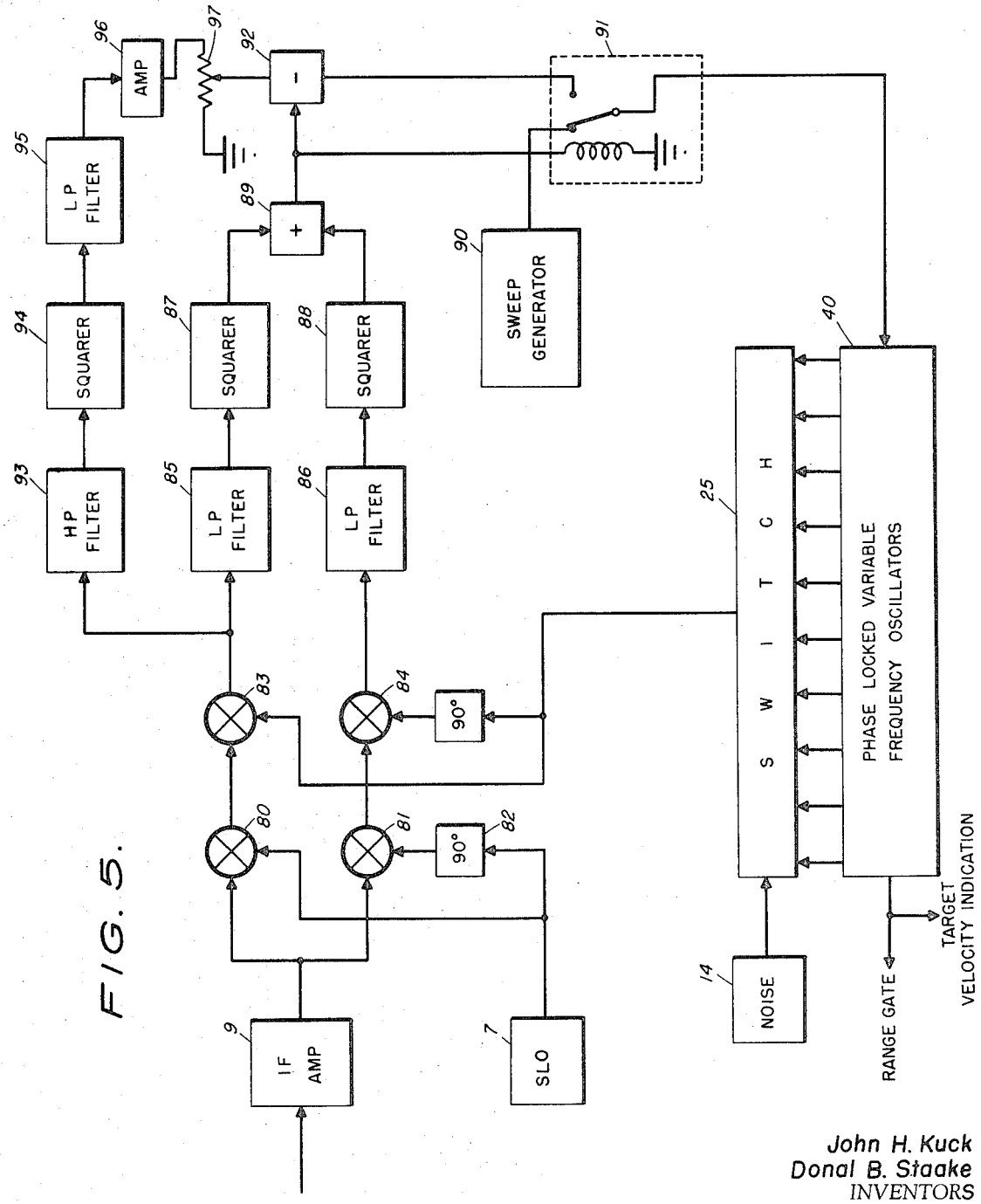
FIG. 5 shows a block diagram comprising a second embodiment of the invention.

A second embodiment of the invention is illustrated in FIG. 5. The system is only shown in part since the front end of the system, consisting of the transmitting and receiving sections, is identical with the comparable portions shown in FIG. 2. In this embodiment the phase shifting unit is combined with the second mixer such that the compensation for Doppler error can be inserted after the second mixer.

The output from first mixer 8 is applied via the conventional I.F. amplifier 9 to a pair of second mixers 80 and 81 where they are mixed with reference I.F. signal from oscillator 7. The reference signal is applied directly to mixer 80 and is applied through a 90° phase shifter 82 to mixer 81. The result is that the outputs of mixers 80 and 81 will represent sine and cosine components, respectively, of the returned Doppler signal which also contains a certain Doppler error depending upon the transmitted signal frequency. The outputs of mixers 80 and 81 are applied to a second pair of mixers 83 and 84, respectively, where they are mixed with the output of a multiple signal source 40 which comprises the phase locked oscillator chain 40 of FIG. 4. The proper signals could also be obtained by feeding a single frequency equal to the lowest Doppler frequency into the phase shifters 15 of FIG. 2 and allowing the phase shifters to add frequency increments thereto. Another scheme for deriving these compensating signals is to use a set of mechanically geared frequency generators. From these examples it may be appreciated that there are a wide variety of possible arrangements of mechanical phase shifters, generators, electronic variable frequency oscillators and modulators which can be combined to perform the basic functions indicated here.

The output of oscillator chain 40 is applied to the mixers 83 and 84 as sine and cosine components, respectively, and consists both of the Doppler signal and the Doppler error signal so that the output of mixers 83 and 84 should consist only of noise signals. However, as will be seen, this will not be the case when the system is operating in the search mode and when operating in the track mode a slight error will usually be present; so that, the output of mixers 83 and 84 will usually contain low frequency or d.c. error signals. The outputs of mixers 83 and 84 are connected, respectively, to a pair of low pass filters 85 and 86 which reject all noise components and pass on the Doppler error signals to a pair of squarers 87 and 88 after which the signals are applied to a summing circuit 89. In this manner, since the sum of the square of the sine and cosine components of a signal produces the amplitude free of phase considerations; the output of summing circuit 89 represents the amplitude of the difference frequency between the received Doppler signal and the output of oscillator chain 40 as this amplitude is modified by the transfer function of the low pass filters 85 and 86; so that difference frequencies near zero produce the maximum output. By this mechanism a closed frequency tracking loop is formed which will cause the frequency of oscillator chain 40 to track target speed in such a way that the output of summer 89 is slightly off the maximum value of the response curve of the filters 85 and 86 so that it equals the output of the potentiometer 97.

During the search mode sweep generator 90 applies a variable voltage signal to oscillator chain 40 via relay 91 so as to cause the outputs of the oscillator chain to sweep. When the output to the mixers 83 and 84 is of proper value to pass a signal through low pass filters 85 and 86 a signal will appear at the output of summing circuit 89 and will be applied to relay 91 so as to switch the relay and close the loop in the system. The output of summing circuit 89 is applied to a difference circuit 92 where it is compared with a threshold voltage. The threshold voltage is derived from the noise output of mixer 83 which is passed by a high pass filter 93, squared in squarer 94 and passed via a low pass filter to an amplifier 96 and potentiometer 97. The output of summing circuit 89 minus the threshold voltage set on regulating circuit 97 will be applied via relay 91 to oscillator chain 40 in such a way as to drive the frequencies of the oscillator chain up and down as required to make the output of summing circuit 89 equal to the threshold voltage. By this means the oscillator chain is caused to track in a way that keeps the input frequency to the low pass filters at a value slightly above zero frequency at a point way down on the response curve of the filters as mentioned above.

The standard utilization circuit for determining range and velocity derives its information from the oscillator chain 15 by suitable means known to the art. Since, after the system has switched to the track mode, the first oscillator of the chain is generating the true Doppler frequency, this signal can be used to derive the required target information.

Obviously many modifications and variations of the present invention are possible in the light of the above teachings. It is therefore to be understood that within the scope of the appended claims, the invention may be practiced otherwise than as specifically described.

What is claimed is:

1. A frequency diversity pulse Doppler radar system comprising a directive antenna, transmitting means for providing a plurality of random signals of different fixed frequencies connected to said antenna so as to generate exploratory pulses of electromagnetic energy, a stable local oscillator, modulating means connected to said transmitting means and said local oscillator for providing a timing reference signal, a first mixer connected to said modulator and said antenna for combining said timing reference signal and a target echo signal to produce a carrier Doppler signal, a second mixer connected to said first mixer and said local oscillator for detecting the Doppler portion of said target echo signal, and phase shifting means connected between said local oscillator and said second mixer for modifying the frequency of the signal from said oscillator to said second mixer so as to compensate for ambiguities in said Doppler signal due to changes in transmitted frequency.

2. A frequency diversity pulse Doppler radar system as defined in claim 1 wherein said phase shifting means comprises a plurality of mechanical phase shifters having their outputs connected to said second mixer, a first switch means connected to each of said mechanical phase shifters and to said local oscillator for selectively connecting said oscillator to one of said mechanical phase shifters, and a control unit for driving each phase shifter at a speed equal to the frequency of the Doppler ambiguity produced by a corresponding transmitted frequency.

3. A frequency diversity pulse Doppler radar system as defined in claim 1 wherein said transmitting means comprises a plurality of fixed frequency sources each producing a signal which differs in frequency from the other source signals by a direct fixed ratio, a noise generator, and a second switch means connected to said source and said antenna for selectively connecting said sources to said directive antenna in response to said noise generator.

4. A frequency diversity pulse Doppler radar system comprising a directive antenna, transmitting means for providing a plurality of signals of different fixed frequencies connected to said antenna so as to generate exploratory pulses of electromagnetic energy, a stable local oscillator, modulating means connected to said transmitting means and said local oscillator for providing a timing reference signal, a first mixer connected to said modulator and said antenna for combining said timing reference signal and a target echo signal to produce a carrier Doppler signal, a second mixer connected to said first mixer and said local oscillator for detecting the Doppler portion of said target echo signal, a plurality of mechanical phase shifters having their outputs connected to said second mixer, a first switch means connected to each of said mechanical phase shifters and to said local oscillator for selectively connecting said oscillator to one of said mechanical phase shifters, and a control means for driving each phase shifter at a continuously varying speed until a proper Doppler signal is detected by said second mixer and for driving each phase shifter at a speed equal to the frequency of the Doppler ambiguity produced by a corresponding transmitted frequency after a proper Doppler signal is detected by said second mixer.

5. A frequency diversity pulse Doppler radar system as defined in claim 4 wherein said transmitting means comprises a plurality of fixed frequency sources each producing a signal which differs in frequency from the other source signals by a direct fixed ratio, a noise generator, and a second switch means connected to said sources and said antenna for selectively connecting said sources to said directive antenna in response to said noise generator.

6. A frequency diversity pulse Doppler radar system as defined in claim 5 wherein said mechanical phase shifters are geared to each other by the direct fixed ratio between corresponding transmitted frequencies and are driven as a unit by a motor controlled by said control means.

7. A frequency diversity pulse Doppler radar system as defined in claim 4 wherein said control means comprises a sawtooth voltage generator, a servo driver connected to said phase shifters for driving said phase shifters at a proper speed, a relay connected to said generator and said servo driver, a variable frequency generator connected to said servo driver for producing a variable frequency signal, a narrow band filter, a third mixer connected to said second mixer, said frequency generator and said filter for comparing the outputs of said second mixer and said variable frequency generator and applying the result to said filter, said filter having a predetermined frequency band such that it will pass only select signals from said third mixer, a detector and a discriminator connected to said filter, said detector being connected to said relay such that signals from said filter will cause said relay to disconnect said sawtooth generator from said servo driver and connect said servo driver to said discriminator.

8. A frequency diversity pulse Doppler radar system comprising a directive antenna, transmitting means for providing a plurality of signals of different fixed frequencies connected to said antenna so as to generate exploratory pulses of electromagnetic energy, a stable local oscillator modulating means connected to said transmitting means and said local oscillator for providing a timing reference signal, a first mixer connected to said modulator and said antenna for combining and timing the reference signal and a target echo signal to produce a carrier Doppler signal, a second mixer connected to said first mixer and said local oscillator for detecting the Doppler portion of said target echo signal, a first switch, a phase locked oscillator chain having the output of each oscillator connected to said first switch, an electronic phase shifting unit selectively connected to one of said phase locked oscillators and connected to the output of said local oscillator for shifting the phase of said local oscillator signal in response to the output of said phase locked oscillator, said phase shifting unit being connected to said second mixer, and a control unit for controlling said oscillator chain such that each oscillator in the chain generates a frequency which is equal to the frequency of the Doppler ambiguity produced by a corresponding transmitted frequency.

9. A frequency diversity pulse Doppler radar system as defined in claim 8 wherein said transmitting means comprises a plurality of fixed frequency sources each producing a signal which differs in frequency from the other source signals by a direct fixed ratio, a noise generator, and a second switch means connected to said sources and said antenna for selectively connecting said sources to said directive antenna in response to said noise generator.

10. A frequency diversity pulse Doppler radar system as defined in claim 9 wherein said phase locked oscillator chain comprises a plurality of variable frequency oscillators, a plurality of first mixers each corresponding to one of said variable frequency oscillators and connected to the output thereof, each of said variable frequency oscillators also being connected to the mixer corresponding to the preceding oscillator in the chain, a plurality of second mixers each corresponding to one of said oscillator first mixer combinations and having their outputs connected to the input of the oscillator subsequent to the one to which they correspond, said second mixers being controlled by said control unit such that the output of each oscillator differs in frequency from the preceding oscillator in the chain by the frequency of the control signal.

11. A frequency diversity pulse Doppler radar system as defined in claim 8 wherein said control unit comprises means for continuously varying the freqeuncy of each of the oscillators in the oscillator chain until a proper Doppler signal is detected by said second mixer and for fixing the output of each oscillator in the oscillator chain at a frequency equal to the frequency of the Doppler ambiguity produced by a corresponding transmitted frequency after a proper Doppler signal is detected by said second mixer.

12. A frequency diversity pulse Doppler radar system as defined in claim 11 wherein said control means comprises a sawtooth voltage generator, a servo driver connected to said phase shifters for driving said phase shifters at a proper speed, a relay connected to said generator and said servo driver, a variable frequency generator connected to said servo driver for producing a variable frequency signal, a narrow band filter, a third mixer connected to said second mixer and said frequency generator and said filter for comparing the outputs of said second mixer and said variable frequency generator and for applying the result to said filter, said filter having a predetermined frequency band such that it will pass only select signals from said third mixer, a detector and a discriminator connected to said filter, said detector being connected to said relay such that signals from said filter will cause said relay to disconnect said sawtooth generator from said servo driver and connect said servo driver to said discriminator.

13. A frequency diversity pulse Doppler radar system comprising a directive antenna, transmitting means for providing a plurality of signals of different fixed frequencies connected to said antenna so as to generate exploratory pulses of electromagnetic energy, a stable local oscillator, modulating means connected to said transmitting means and said local oscillator for providing a timing reference signal, a first mixer connected to said modulator and said antenna for combining said timing reference signal and a target echo signal to produce a carrier Doppler signal, detecting means connected to said first mixer and said local oscillator for detecting the Doppler portion of said echo signal, a variable frequency generator, a second mixing means connected to said detecting means and said second mixing means for mixing the output signals from said units, and means for varying the frequency of said generating means so that the output of said second mixing means is free of Doppler frequencies.

14. A frequency diversity pulse Doppler radar system as defined in claim 13 wherein said transmitting means comprises a plurality of fixed frequency sources each producing a signal which differs in frequency from the other source signals by a direct fixed ratio, a noise generator, and a second switch means connected to said sources and said antenna for selectively connecting said sources to said directive antenna in response to said noise generator.

15. A frequency diversity pulse Doppler radar system as defined in claim 14 wherein said detecting means comprises a first pair of mixers for combining the output of said first mixer with sine and cosine components of said local oscillator output, said second mixing means comprises a second pair of mixers for combining the outputs of said first pair of mixers with sine and cosine components of the output of said variable frequency generator, and said variable frequency generator comprises a phase locked oscillator chain.

16. A frequency diversity pulse Doppler radar system as defined in claim 15 wherein said means for varying the frequency of said generating means comprises a pair of low pass filters, a pair of squarers, and an adder interconnected such that the output signals from said second pair of mixers are filtered, squared and then combined in said adder, a noise threshold detecting means, and means for comparing the output of said adder with the output of said threshold detecting means and for applying the result to said variable frequency generator.

17. A frequency diversity pulse Doppler radar system as defined in claim 16 wherein said phase locked oscillator chain comprises a plurality of variable frequency oscillators, a plurality of first mixers each corresponding to one of said variable frequency oscillators and connected to the output thereof, each of said variable frequency oscillators also being connected to the mixer corresponding to the preceding oscillator in the chain, a plurality of second mixers each corresponding to one of said oscillator first mixer combinations and having their outputs connected to the input of the oscillator subsequent to the one to which they correspond, said second mixers being controlled by said control unit such that the output of each oscillator differs in frequency from the preceding oscillator in the chain by the frequency of the control signal.

18. A frequency diversity pulse Doppler radar system comprising a directive antenna, transmitting means for providing a plurality of signals of different fixed frequencies connected to said antenna so as to generate exploratory pulses of electromagnetic energy, a stable local oscillator, modulating means connected to said transmitting means and said local oscillator for providing a timing reference signal, a first mixer connected to said modulator and said antenna for combining said timing reference signal and a target echo signal to produce a carrier Doppler signal, detecting means connected to said first mixer and said local oscillator for detecting the Doppler portion of said echo signal, a variable frequency generator, a second mixing means connected to said detecting means and said second mixing means for mixing the output signals from said units, a relay connected to said variable frequency generator, sweep generator means connected to said relay for driving said variable frequency generator through a range of frequencies, and means for detecting the presence of Doppler frequencies in the output of said second mixing means connected to said relay such that an output from said Doppler detecting means will be applied to said variable frequency generator in place of said sweep generator means.

* * * * *